United States Patent
Aftab et al.

(10) Patent No.: US 10,127,587 B2
(45) Date of Patent: Nov. 13, 2018

(54) VIRTUALIZED SERVICES DISCOVERY AND RECOMMENDATION ENGINE

(71) Applicant: AT&T Intellectual Property I, L.P., Atlanta, GA (US)

(72) Inventors: Syed Anwar Aftab, Budd Lake, NJ (US); Arthur Martella, Morris Plains, NJ (US); Mazin E. Gilbert, Warren, NJ (US); John F. Murray, Denville, NJ (US); Rittwik Jana, Montville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 428 days.

(21) Appl. No.: 14/931,997

(22) Filed: Nov. 4, 2015

(65) Prior Publication Data
US 2017/0124614 A1    May 4, 2017

(51) Int. Cl.
*G06Q 30/00* (2012.01)
*G06Q 30/06* (2012.01)

(52) U.S. Cl.
CPC ..... *G06Q 30/0609* (2013.01); *G06Q 30/0611* (2013.01); *G06Q 30/0621* (2013.01); *G06Q 30/0631* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| | | | |
|---|---|---|---|
| 8,185,905 B2 | 5/2012 | Cook | |
| 8,495,568 B2 | 7/2013 | Ackerman | |
| 8,661,433 B2 | 2/2014 | Gattegno | |
| 2013/0211950 A1* | 8/2013 | Nice | G06Q 30/0631 705/26.7 |
| 2014/0280946 A1 | 9/2014 | Mukherjee et al. | |
| 2015/0067125 A1 | 3/2015 | Madani et al. | |
| 2015/0067126 A1 | 3/2015 | Madani et al. | |
| 2015/0067127 A1 | 3/2015 | Madani et al. | |
| 2015/0213106 A1* | 7/2015 | Kunde | G06F 17/30589 718/1 |

OTHER PUBLICATIONS

Jadhav et al., "Framework for evaluation and selection of the software packages: A hybrid knowledge based system approach," The Journal of Systems and Software, Mar. 21, 2011, pp. 1394-1407.

(Continued)

*Primary Examiner* — Ethan D Civan
(74) *Attorney, Agent, or Firm* — Hartman & Citrin LLC

(57) ABSTRACT

Concepts and technologies are disclosed herein for a virtualized services discovery and recommendation engine. A request for a service can be received from a requestor. The request can include feature data that can define two or more features. Two or more features can be determined based on the feature data and requestor data associated with the requestor can be obtained. Two or more services that satisfy the request can be identified and a recommendation that represents the two or more services can be generated. The recommendation can include a data representation of a custom product that can include the two or more services. The recommendation can be tested to determine if the custom product functions, and the recommendation can be provided to the requestor.

20 Claims, 5 Drawing Sheets

(56) References Cited

OTHER PUBLICATIONS

Passos et al., "Feature-Oriented Software Evolution," Proceedings of the Seventh International Workshop on Variability Modelling of Software-intensive Systems, Jan. 23-25, 2013, pp. 95-102, ACM.

Li et al., "Design and Evaluation of a Command Recommendation System for Software Applications," ACM Transactions on Computer-Human Interaction (TOCHI), Jun. 2011, vol. 18, No. 2, Art. 6, ACM.

Martin et al., "The Big Promise of Recommender Systems," AI Magazine, Fall 2011, pp. 19-27, vol. 32, No. 3, Association for the Advancement of Artificial Intelligence.

* cited by examiner

VIRTUALIZED SERVICES DISCOVERY AND RECOMMENDATION ENGINE

BACKGROUND

In some modern networks, networking software may be configured to run on dedicated hardware. In many such cases, the software can be often tightly integrated with the hardware. To deploy a new network service, new software generally must be created and tied to a new dedicated hardware device. Thus, product catalogs may be created based on deployed network services that have previously been created and/or offered by a provider or other entity. Furthermore, changing services and/or service components may require updating the software and/or the associated and tightly integrated hardware. Because the software often is hard coded for the dedicated software, such changes may not be trivial.

SUMMARY

The present disclosure is directed to a virtualized services discovery and recommendation engine. A computing device such as a server computer can execute a discovery and recommendation engine. The computing device can receive a request for a service such as a service request from a requestor. The requestor can be, but is not necessarily, associated with a data center and/or resources thereof. The service request can specify one or more features, services, service components, and/or other types of functionality that are requested by the requestor. The combination of services that is requested by way of the service request may correspond to a product that is not offered (e.g., the combination of services may correspond to a custom product).

The computing device can determine, based upon the request and/or based upon feature data included with the request, one or more features of the service that is or are being requested by way of the service request. The computing device also can obtain requestor data. The requestor data can include history data that can define a history associated with the requestor and therefore may include information reflecting past use of services and/or service components. The requestor data also can include configuration data that can describe one or more present or past network configurations associated with the requestor and/or inventory data that can define a past and/or present inventory associated with the requestor. Based on the requestor data and the service request, the computing device can identify services and/or service components that satisfy the service request.

Based upon the service request and the requestor data, the computing device can generate one or more recommendations. The recommendations can include data files that define and/or describe a custom product that includes the services and/or service components determined to be relevant to the service request. The computing device can provide the recommendations to a test module or other testing entity, which can but is not necessarily included as part of the discovery and recommendation engine and/or executed by the computing device. The testing entity can test the recommendation and/or simulate execution of an application or service represented by the recommendation to determine if the custom product functions appropriately. The computing device can make changes, if needed, based on errors or the like determined and/or detected during the testing.

The computing device also can obtain pricing information for the recommendation, inventory information associated with a data center at which the service or application will be activated, and/or various marketing information such as whether or not the custom product should be added to the catalog for offering to other users. This and other information can be included as part of the recommendation. The computing device can provide the recommendation to a requestor for approval and/or consideration. If the requestor approves the recommendation, the computing device can receive a service order. The computing device can generate one or more commands for deploying, activating, and/or instantiating the application or service and deploy the commands to a data center. Thus, the computing device can create and/or deploy custom applications. These and other aspects of the concepts and technologies described herein will be illustrated and described in more detail below.

According to one aspect of the concepts and technologies disclosed herein, a system is disclosed. The system can include a processor and a memory. The memory can store computer-executable instructions that, when executed by the processor, cause the processor to perform operations. The operations can include receiving a request for a service from a requestor, the request including feature data that can define two or more features; determining, based on the feature data, the two or more features; obtaining requestor data associated with the requestor; identifying two or more services that satisfy the request; generating a recommendation that represents the two or more services, the recommendation including a data representation of a custom product that can include the two or more services; testing the recommendation to determine if the custom product functions; and providing the recommendation to the requestor.

In some embodiments, generating the recommendation can include assembling the two or more services that satisfy the request to create the custom product. In some embodiments, generating the recommendation further can include determining an active inventory associated with the requestor to verify that the custom product can be accommodated by a data center associated with the requestor; determining a pricing associated with the custom product; and determining if the custom product should be added to a product catalog. In some embodiments, determining the active inventory can include accessing an active and available inventory to determine an available inventory associated with the requestor.

In some embodiments, determining the pricing can include accessing a billing system, providing the recommendation to the billing system, and receiving the pricing from the billing system. In some embodiments, the requestor data can include inventory data that can define an inventory associated with the requestor. In some embodiments, the computer-executable instructions, when executed by the processor, cause the processor to perform additional operations. The additional operations can include receiving a service order from the requestor, the service order including data that indicates that the custom product should be deployed; generating commands to deploy the custom product; and sending the commands to the a data center associated with the requestor.

In some embodiments, the requestor data can include history data that can define a service usage history associated with the requestor. In some embodiments, the recommendation can include pricing information associated with the custom product, ordering information associated with the custom product, and operational information associated with the custom product. In some embodiments, the system also can include a portal. The request can be received via the portal. Receiving the request can include presenting a user interface that presents a catalog of services and receiving, via the user interface, selection of two or more of the services.

According to another aspect of the concepts and technologies disclosed herein, a computer storage medium is disclosed. The computer storage medium can have computer-executable instructions stored thereon that, when executed by a processor, cause the processor to perform operations. The operations can include receiving a request for a service from a requestor, the request including feature data that can define two or more features; determining, based on the feature data, the two or more features; obtaining requestor data associated with the requestor; identifying two or more services that satisfy the request; generating a recommendation that represents the two or more services, the recommendation including a data representation of a custom product that can include the two or more services; testing the recommendation to determine if the custom product functions; and providing the recommendation to the requestor.

In some embodiments, generating the recommendation can include assembling the two or more services that satisfy the request to create the custom product; determining an active inventory associated with the requestor to verify that the custom product can be accommodated by a data center associated with the requestor; determining a pricing associated with the custom product; and determining if the custom product should be added to a product catalog. In some embodiments, the computer-executable instructions, when executed by the processor, cause the processor to perform additional operations. The additional operations can include receiving a service order from the requestor, the service order including data that indicates that the custom product should be deployed; generating commands to deploy the custom product; and sending the commands to the data center associated with the requestor. In some embodiments, the recommendation can include pricing information associated with the custom product, ordering information associated with the custom product, and operational information associated with the custom product. In some embodiments, the request can be received via a portal. Receiving the request can include presenting a user interface that presents a catalog of services and receiving, via the user interface, selection of two or more of the services.

According to yet another aspect, a method is disclosed. The method can include receiving, at a computing device that executes a discovery and recommendation engine, a request for a service from a requestor. The request can include feature data that can define two or more features. The method also can include determining, based on the feature data, the two or more features and obtaining requestor data associated with the requestor. The method also can include identifying two or more services that satisfy the request, generating a recommendation that represents the two or more services, the recommendation including a data representation of a custom product that can include the two or more services, testing the recommendation to determine if the custom product functions, and providing the recommendation to the requestor.

In some embodiments, generating the recommendation can include assembling the two or more services that satisfy the request to create the custom product; determining an active inventory associated with the requestor to verify that the custom product can be accommodated by a data center associated with the requestor; determining a pricing associated with the custom product; and determining if the custom product should be added to a product catalog. In some embodiments, the method further can include receiving a service order from the requestor, the service order including data that indicates that the custom product should be deployed; generating commands to deploy the custom product; and sending the commands to a data center associated with the requestor. In some embodiments, the recommendation can include pricing information associated with the custom product, ordering information associated with the custom product, and operational information associated with the custom product. In some embodiments, the request can be received via a portal. Receiving the request can include presenting a user interface that presents a catalog of services and receiving, via the user interface, selection of two or more of the services.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
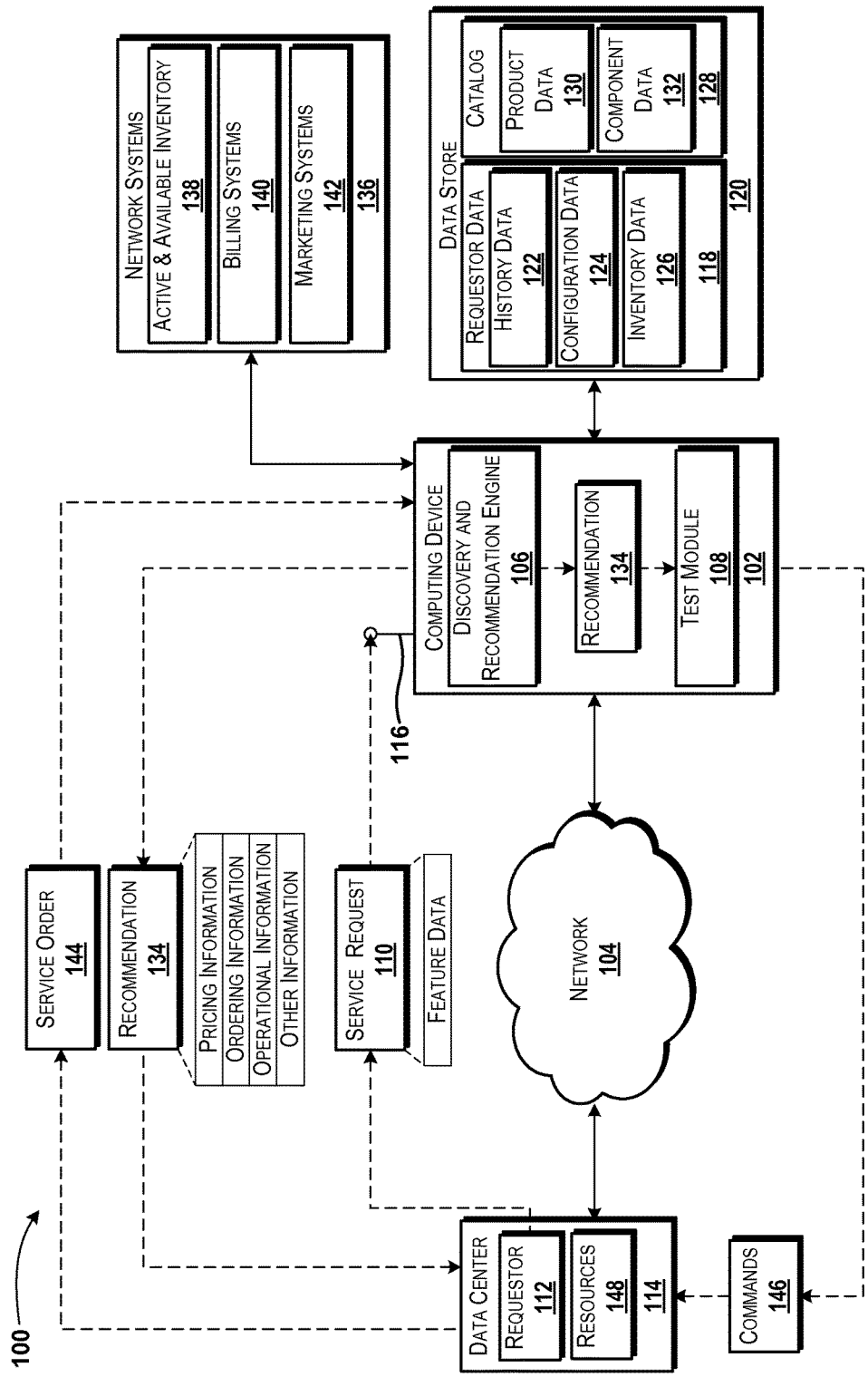
FIG. 1 is a system diagram illustrating an illustrative operating environment for various embodiments of the concepts and technologies described herein.

The present disclosure is directed to a virtualized services discovery and recommendation engine. A computing device such as a server computer can execute a discovery and recommendation engine. The computing device can receive a request for a service such as a service request from a requestor. The requestor can be, but is not necessarily, associated with a data center and/or resources thereof. The service request can specify one or more features, services, service components, and/or other types of functionality that are requested by the requestor. The combination of services that is requested by way of the service request may correspond to a product that is not offered (e.g., the combination of services may correspond to a custom product).

The computing device can determine, based upon the request and/or based upon feature data included with the request, one or more features of the service that is or are being requested by way of the service request. The computing device also can obtain requestor data. The requestor data can include history data that can define a history associated with the requestor and therefore may include information reflecting past use of services and/or service components. The requestor data also can include configuration data that can describe one or more present or past network configurations associated with the requestor and/or inventory data that can define a past and/or present inventory associated with the requestor. Based on the requestor data and the service request, the computing device can identify services and/or service components that satisfy the service request.

Based upon the service request and the requestor data, the computing device can generate one or more recommendations. The recommendations can include data files that define and/or describe a custom product that includes the services and/or service components determined to be relevant to the service request. The computing device can provide the recommendations to a test module or other testing entity, which can but is not necessarily included as part of the discovery and recommendation engine and/or executed by the computing device. The testing entity can test the recommendation and/or simulate execution of an application or service represented by the recommendation to determine if the custom product functions appropriately. The computing device can make changes, if needed, based on errors or the like determined and/or detected during the testing.

The computing device also can obtain pricing information for the recommendation, inventory information associated with a data center at which the service or application will be activated, and/or various marketing information such as whether or not the custom product should be added to the catalog for offering to other users. This and other information can be included as part of the recommendation. The computing device can provide the recommendation to a requestor for approval and/or consideration. If the requestor approves the recommendation, the computing device can receive a service order. The computing device can generate one or more commands for deploying, activating, and/or instantiating the application or service and deploy the commands to a data center. Thus, the computing device can create and/or deploy custom applications. These and other aspects of the concepts and technologies described herein will be illustrated and described in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for a virtualized services discovery and recommendation engine will be described, according to an illustrative embodiment. The operating environment 100 shown in FIG. 1 includes a computing device 102. The computing device 102 can operate in communication with and/or as part of a communications network ("network") 104, though this is not necessarily the case.

According to various embodiments, the functionality of the computing device 102 may be provided by one or more server computers, desktop computers, mobile telephones, laptop computers, set-top boxes, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as a server computer. It should be understood that this embodiment is illustrative, and should not be construed as being limiting in any way.

The computing device 102 can execute an operating system (not shown in FIG. 1) and one or more application programs such as, for example, a discovery and recommendation engine 106, a test module 108, and/or other application programs. The operating system can include a computer program for controlling the operation of the computing device 102. The application programs can include executable programs configured to execute on top of the operating system to provide various functions as illustrated and described herein.

The discovery and recommendation engine 106 can be configured to receive a service request 110. According to various embodiments of the concepts and technologies described herein, the service request 110 can be created and/or generated by a requestor 112. In some embodiments, the requestor 112 can be located within and/or can be associated with a data center 114, though this is not necessarily the case. It can be appreciated that the requestor 112 can access the computing device 102 via a portal, ordering platform, ordering page, an application programming interface ("API"), and/or other functionality (labeled as element 116 in FIG. 1) that can be exposed by the computing device 102. Thus, it should be understood that the service request 110 can correspond, in some embodiments, to data provided to the computing device 102 via a web portal, or the like; a service or application call transmitted to the computing device 102; and/or other types of requests and/or data. Thus, element 116 in FIG. 1 can correspond to an API, a portal, an interface, and/or other functionality that can be exposed by the computing device 102 to enable creation and/or submission of the service request 110 and/or application calls to invoke the functionality of the discovery and recommendation engine 106 and/or test module 108. It should be understood that this example is illustrative and therefore should not be construed as being limiting in any way.

The discovery and recommendation engine 106 can determine, based upon the service request 110, a service that is requested by way of the service request 110. Thus, for example, the discovery and recommendation engine 106 can determine what features and/or components are desired in the service being requested by the service request 110. The features can be specified by feature and/or component data ("feature data") that can be included with and/or as a part of the service request 110. For example, the feature data may specify that the service being requested by way of the service request 110 should include an authentication feature, a data storage component, a data processing component, a communication feature, combinations thereof, or the like. It should be understood that these examples are illustrative and therefore should not be construed as being limiting in any way.

The discovery and recommendation engine 106 can analyze the service request 110 and determine, based on the contents of the service request 110 and/or based on feature data included with the service request 110, what services, features, and/or components are desired in the service being requested. The discovery and recommendation engine 106 also can identify the requestor 112. In some embodiments, the discovery and recommendation engine 106 can identify the requestor 112 based upon identifying the data center 114, based on information included in the service request 110, based on other information and/or data, combinations thereof, or the like. The discovery and recommendation engine 106 can use the identity of the requestor 112 to obtain requestor data 118 that relates to the requestor 112.

The requestor data 118 can be stored in a data storage device such as a data store 120. The functionality of the data store 120 can be provided by one or more databases, server computers, hard drives, desktop computers, other computing systems and/or data storage devices, combinations thereof, or the like. In the illustrated embodiment shown in FIG. 1, the functionality of the data store 120 is provided by a server computer that can be configured to store and/or host the requestor data 118. It should be understood that this example is illustrative and therefore should not be construed as being limiting in any way.

The requestor data 118 can include information associated with the requestor 112 such as, for example, history data 122, configuration data 124, inventory data 126, and/or other data. The history data 122 can represent a history of usage associated with the requestor 112 and/or an associated data center 114. Thus, the history data 122 can represent applications, services, service components, and/or other functionality that has been used by the requestor 112 and/or systems associated with the requestor 112 (e.g., a data center 114) over a particular timeframe.

In some embodiments, the timeframe can be for an entire duration over which usage associated with the requestor 112 has been monitored, while in some other embodiments, the timeframe may correspond to a sliding window of one day, one week, one month, one year, two years, or the like. Thus, the history data 122 can represent usage associated with the requestor 112 over a specified time period and such information may be instructive when determining how to meet requests associated with the requestor 112. The history data 122 also can be used to identify products, services, and/or service components already in use by the requestor 112 based on the assumption (that may or may not be accurate) that such use may indicate that the requestor 112 approves of these products, services, and/or service components. It should be understood that this example is illustrative and therefore should not be construed as being limiting in any way.

The configuration data 124 can represent network configuration data associated with the requestor 112. According to various embodiments, the computing device 102 can obtain the configuration data 124 from reporting mechanisms associated with the data center 114, the requestor 112, and/or other systems as will be illustrated and described below in more detail. The configuration data 124 can indicate what network configurations are used to provide various services and/or features in the data center 114. This information may be used to determine how to configure the applications or services that are being requested. It should be understood that this example is illustrative and therefore should not be construed as being limiting in any way.

The inventory data 126 can include past and/or present inventory information associated with the requestor 112 and/or the data center 114. The inventory data 126 can be used to determine whether or not the data center 114 can support the services, features, and/or service components being requested by the requestor 112. According to various embodiments, the inventory data 126 can be obtained from various inventory entities, network monitors, and/or other systems as will be illustrated and described below in more detail. The computing device 102 can use the history data 122, the configuration data 124, and/or the inventory data 126 to create one or more recommended services and/or service components, as will be explained in more detail below.

It should be understood that other entities may be accessed to determine a current inventory associated with the requestor 112 and/or the data center 114, as will be illustrated and described in more detail below. As such, the inventory data 126 may correspond to historical inventory usage information and/or may be used to indicate how inventory is and/or is not used. It should be understood that this example is illustrative and therefore should not be construed as being limiting in any way.

The discovery and recommendation engine 106 can analyze the service request 110 and the requestor data 118 to identify one or more services and/or components that satisfy the service request 110 (e.g., that provide the services and/or service functions or features requested by way of the service request 110). In various embodiments of the concepts and technologies described herein, the data store 120 also can store a service and service component catalog ("catalog") 128. The catalog 128 can include data that defines or represents products, services, and/or service components that can be offered by a service provider. According to various embodiments, the catalog 128 can include product data 130 and component data 132. Because the catalog 128 can include other information and/or data, it should be understood that the illustrated example is illustrative and therefore should not be construed as being limiting in any way.

The product data 130 can represent one or more products. According to various embodiments of the concepts and technologies described herein, products can include one or more services, features, applications, and/or components. According to some embodiments, the products can include one or more services, and these products can be represented by the product data 130. For example, product data 130 for a first product P1 may indicate that the first product P1 includes services S1 and S2; product data 130 for a second product P2 may indicate that the second product P2 includes service S2; product data 130 for a third product P3 may indicate that the third product P3 includes services S2 and S3; and so on. Thus, the product data 130 can define products (e.g., services or applications) by their components such as service features, application features, functionality, combinations thereof, or the like. Because products can be defined in additional and/or alternative manners, it should be understood that this example is illustrative and therefore should not be construed as being limiting in any way.

The component data 132 can define the services, service features, application features, and/or other components that can be combined to provide one or more products. According to some embodiments, the component data 132 can describe the components and/or include information that can define what resources are used by the components. Thus, for example, component data 132 associated with a first service S1 may indicate that resources R1 and R2 are used by the first service S1; component data 132 associated with a second service S2 may indicate that resources R2, R3, and R4 are used by the second service S2; component data 132 associated with a third service S3 may indicate that resources R4 and R5 are used by the third service S3; and so on. Thus, by collectively referring to the example embodiments of the product data 130 and the component data 132 described immediately above, the discovery and recommendation engine 106 can determine, for example, that a product P3 includes services S2 and S3 and will therefore use resources R2, R3, R4, and R5. It should be understood that this example is illustrative and therefore should not be construed as being limiting in any way.

Thus, the discovery and recommendation engine 106 can analyze the catalog 128 to identify existing products (e.g., via analyzing the product data 130) and/or can compile one or more custom products (e.g., via combining one or more of the services represented by the component data 132). In particular, the discovery and recommendation engine 106 can identify the services and/or service components that are responsive to the service request 110 (e.g., services and/or service components that would provide the features requested by way of the service request 110) and generate one or more recommendation 134 based on the identified services and/or service components.

In various embodiments, the recommendation 134 can correspond to a data file (e.g., a JSON file, an XML file, or the like) that can define or describe the custom product that satisfies the service request 110. The recommendations 134 can include, in various embodiments of the concepts and technologies described herein, a data representation of a custom product such as a custom application or service that may not be offered by a provider and/or that therefore may not be represented by the product data 130. Thus, the recommendations 134 can correspond to one or more custom applications or services that may be tailored based upon the service request 110 and/or the requestor data 118. It should be understood that this example is illustrative and therefore should not be construed as being limiting in any way.

The discovery and recommendation engine 106 can provide the one or more recommendations 134 to the test module 108 for testing. The test module 108 can be configured to execute (or simulate execution of) the one or more applications or services represented by the recommendations 134. The execution or simulated execution can be completed in a test environment, and because the services and/or applications may correspond to virtual services, the test environment can effectively simulate the actual operational environment of the services and/or applications. According to various embodiments of the concepts and technologies described herein, the testing of the applications or services represented by the one or more recommendations 134 can be performed to ensure that the new combination of features functions properly. It can be appreciated that the testing may be performed because the recommendations 134 can correspond to custom applications or services that otherwise may not exist and/or be in use, in some embodiments.

In some embodiments, to perform the testing of the applications or services represented by the one or more recommendations 134 (e.g., a custom product), the test module 108 can be configured to execute scripts or programs that can simulate operation of the applications or services represented by the recommendations 134. Thus, the applications or services represented by the recommendations 134 can be tested in a simulated operational environment and any errors can be identified and/or addressed. For example, if the applications or services represented by the recommendations 134 are determined not to function correctly and/or to include errors, the discovery and recommendation engine 106 and/or the test module 108 can be configured to modify the recommendations 134 (and thereby the corresponding applications and/or services) so that these errors are removed or the impact of these errors is at least reduced. According to various embodiments, the recommendations 134 can be updated to reflect any changes, if any are made, during the testing and/or test evaluation process. It should be understood that this example is illustrative and therefore should not be construed as being limiting in any way.

In addition to representing a custom product or service, the recommendations 134 also can include other information, as shown in FIG. 1. In particular, the discovery and recommendation engine 106 can be configured to access one or more network systems 136 to determine pricing information for the recommendation 134, ordering information for the recommendation 134, operational information for the recommendation 134, and/or other information for the recommendation 134. In some embodiments, for example, the discovery and recommendation engine 106 can access an active and available inventory 138 to determine what resources associated with the requestor 112 and/or the data center 114 are available. Thus, the active and available inventory 138 can be accessed to determine if one or more of the applications or services represented by the recommendation 134 can be instantiated at the data center 114.

Additionally, or alternatively, the discovery and recommendation engine 106 can access one or more charging, pricing, and/or billing systems ("billing systems") 140 to determine pricing information for the recommendation 134. The pricing information can indicate procurement costs for the applications or services associated with the recommendations 134, operational costs for operating the applications or services associated with the recommendations 134, and the like. In some embodiments, the computing device 102 can access the billing systems 140, submit the recommendation 134 to the billing systems 140, and receive the pricing from the billing systems 140. It can be appreciated that the billing system 140 can be configured to charge a flat fee (as part of the price) to build the custom product (recommendation 134) using the discovery and recommendation engine 106; a price per service or service component included in the custom product; combinations thereof; and/or otherwise can determine the pricing using set prices and an evaluation of the features of the recommendation 134. It should be understood that this example is illustrative and therefore should not be construed as being limiting in any way.

Additionally, or alternatively, the discovery and recommendation engine 106 can access the marketing systems 142 to determine if the applications or services associated with the recommendations 134 are to be marketed, added to the catalog 128, or the like. The discovery and recommendation engine 106 can determine, for example, that the applications or services associated with the recommendations 134 should be offered to other requestors and therefore can add the applications or services associated with the recommendations 134 to the catalog 128 (e.g., as the product data 130 and/or component data 132). This determination can be made, in some embodiments, in response to receiving an approval of the recommendation 134, as will be explained in more detail below. The marketing systems 142 also can be accessed to determine if the applications or services associated with the recommendations 134 should be marketed to other entities. Because the marketing systems 142 can be accessed for additional and/or alternative reasons, it should be understood that these examples are illustrative and therefore should not be construed as being limiting in any way.

The discovery and recommendation engine 106 can provide one or more of the recommendations 134 (original or updated) to the requestor 112. It therefore can be appreciated that the recommendations 134 can correspond to a response to the service request 110, though this is not necessarily the case. The requestor 112 can determine if the recommendations 134 meet the needs and/or desires of the requestor 112 as reflected by the service request 110. Thus, the requestor 112 can evaluate the one or more recommendation 134 and determine if the one or more recommendation 134 includes the features requested by the service request 110. The recommendations 134 also can include pricing information and/or ordering information, in various embodiments, as noted above. Thus, the requestor 112 can also determine if the recommendation 134 satisfies various budget constraints and/or the like.

If the requestor 112 approves of one or more of the recommendations 134, the requestor 112 can send one or more service orders 144 to the computing device 102. The service orders 144 can approve of one or more of the recommendations 134 and/or otherwise request instantiation of one or more of the applications or services represented by the recommendations 134. Thus, the service orders 144 can effectively request or approve instantiation or provisioning of the applications or services represented by the recommendations 134. Because the applications or services represented by the recommendations 134 can be ordered in additional and/or alternative ways, it should be understood that this example is illustrative and therefore should not be construed as being limiting in any way.

The computing device 102 (e.g., via execution of the discovery and recommendation engine 106 or other functionality) can be configured to detect receipt of the service order 144. The computing device 102 can be configured to determine, based upon receiving the service order 144, that one or more of the recommendations 134 have been approved and/or that instantiation and/or activation of the applications or services represented by the recommendations 134 is requested. Because the computing device 102 can detect approval of the recommendations 134 in additional and/or alternative manners, it should be understood that this example is illustrative and therefore should not be construed as being limiting in any way.

In response to determining that activation and/or instantiation of one or more of the applications or services represented by the recommendations 134 has been requested (e.g., by way of the service order 144), the computing device 102 can be configured to generate one or more commands 146. The commands 146 can be generated to effect instantiation and/or activation of the applications or services represented by the recommendations 134 and/or the service orders 144. It should be understood that the commands 146 can be generated, in some embodiments, by the discovery and recommendation engine 106. In some other embodiments, an ordering and/or orchestration platform may generate the commands 146. In the illustrated embodiment, the commands 146 are generated by the discovery and recommendation engine 106. It should be understood that this example is illustrative and therefore should not be construed as being limiting in any way.

The computing device 102 can send the commands 146 to one or more resources 148 associated with the data center 114. The resources 148 can include, for example, an orchestration module and/or other entities that can effect activation and/or instantiation of the applications or services represented by the recommendations 134. Although the requestor 112 is illustrated as being separate from the resources 148, it should be understood that in some embodiments the requestor 112 can receive the commands 146 and/or that the requestor 112 can correspond to an orchestration service or other functionality that can activate and/or instantiate the applications or services represented by the recommendations 134.

The commands 146 can include instructions and/or code that, when received and/or executed, can cause the data center 114 and/or the resources 148 associated with the data center 114 to instantiate and/or activate the applications or services represented by the recommendations 134 and/or the service orders 144. Because the service or application associated with the recommendation 134 and/or the service order 144 can be instantiated in additional and/or alternative manners, it should be understood that this example is illustrative and therefore should not be construed as being limiting in any way.

In practice, a computing device 102 (e.g., a server computer) can execute a discovery and recommendation engine 106. The computing device 102 can receive a request for a service such a service request 110 from a requestor 112. The requestor 112 can be, but is not necessarily, associated with a data center 114 and/or resources thereof. The service request 110 can specify one or more features, services, service components, and/or other types of functionality that are requested by the requestor 112. The combination of services that is requested by way of the service request 110 may correspond to a product that is not offered (e.g., the combination of services may correspond to a custom product).

The computing device 102 can determine, based upon the service request 110 and/or based upon feature data included with the service request 110, one or more features of the service that is or are being requested by way of the service request 110. The computing device 102 also can obtain requestor data 118. The requestor data 118 can include history data 122 that can define a history associated with the requestor 112 and therefore may include information reflecting past use of services and/or service components. The requestor data 118 also can include configuration data 124 that can describe one or more present or past network configurations associated with the requestor 112 and/or inventory data 126 that can define a past and/or present inventory associated with the requestor 112. Based on the requestor data 118 and the service request 110, the computing device 102 can identify services and/or service components that satisfy the service request 110.

Based upon the service request 110 and the requestor data 118, the computing device 102 can generate one or more recommendations 134. The recommendations 134 can include data files that define and/or describe a custom product that includes the services and/or service components determined to be relevant to the service request 110. The computing device 102 can provide the recommendations 134 to a test module 108 or other testing entity, which can but is not necessarily included as part of the discovery and recommendation engine 106 and/or executed by the computing device 102. The testing entity can test the recommendation 134 and/or simulate execution of an application or service represented by the recommendation 134 to determine if the custom product functions appropriately. The computing device 102 can make changes, if needed, based on errors or the like determined and/or detected during the testing.

The computing device 102 also can obtain pricing information for the recommendation 134, inventory information associated with a data center 114 at which the service or application will be activated, and/or various marketing information such as whether or not the custom product should be added to the catalog 128 for offering to other users. This and other information can be included as part of the recommendation 134. The computing device 102 can provide the recommendation 134 to a requestor for approval and/or consideration. If the requestor 112 approves the recommendation 134, the computing device 102 can receive a service order. The computing device 102 can generate one or more commands for deploying, activating, and/or instantiating the application or service and deploy the commands to a data center 114. Thus, the computing device 102 can create and/or deploy custom applications.

Although the discovery and recommendation engine 106 and the test module 108 are illustrated as components of the computing device 102, it should be understood that each of these components, or combinations thereof, may be embodied as or in stand-alone devices or components thereof operating as part of or in communication with the network 104 and/or the computing device 102. As such, the illustrated embodiment should be understood as being illustrative of only some contemplated embodiments and should not be construed as being limiting in any way.

FIG. 1 illustrates one computing device 102, one network 104, one data center 114, and one data store 120. It should be understood, however, that various implementations of the operating environment 100 can include zero, one, or more than one computing device 102; zero, one, or more than one network 104; zero, one, or more than one data center 114; and/or zero, one, or more than one data store 120. As such, the illustrated embodiment should be understood as being illustrative, and should not be construed as being limiting in any way.

Figure 2:
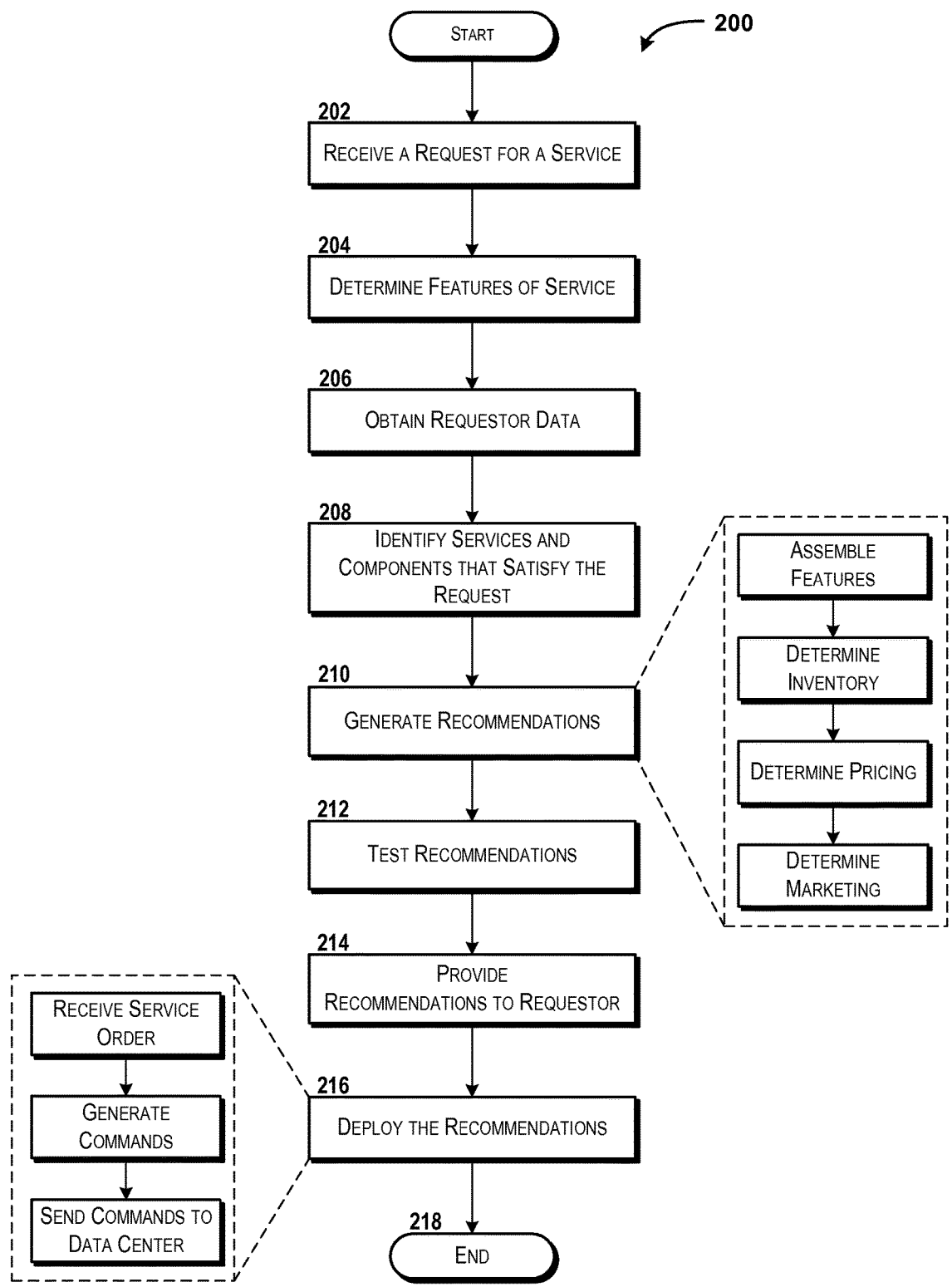
FIG. 2 is a flow diagram showing aspects of a method for discovering and recommending services, according to an illustrative embodiment of the concepts and technologies described herein.

Turning now to FIG. 2, aspects of a method 200 for discovering and recommending services will be described in detail, according to an illustrative embodiment. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, to perform one or more operations and/or causing the processor to direct other components of the computing system or device to perform one or more of the operations.

For purposes of illustrating and describing the concepts of the present disclosure, the method 200 disclosed herein is described as being performed by the computing device 102 via execution of one or more software modules such as, for example, the discovery and recommendation engine 106 and/or the test module 108. It should be understood that additional and/or alternative devices and/or network nodes can provide the functionality described herein via execution of one or more modules, applications, and/or other software including, but not limited to, the discovery and recommendation engine 106 and/or the test module 108. Thus, the illustrated embodiments are illustrative, and should not be viewed as being limiting in any way.

The method 200 begins at operation 202. At operation 202, the computing device 102 can receive a request for a service or application. In various embodiments of the concepts and technologies described herein, the request received in operation 202 can include the service request 110 illustrated and described above with reference to FIG. 1. As explained above with regard to the service request 110, the request received in operation 202 can include feature and/or component data that can identify and/or describe one or more features that are requested by way of the request received in operation 202.

As explained above with reference to FIG. 1, the request received in operation 202 can be received from a requestor 112 and/or other entities. Also, the request can be created via functionality exposed by the computing device 102 such as, for example, a portal, a web portal, an ordering platform, an API, combinations thereof, or the like. Thus, the request may not actually be "received" in operation 202, as the request may be created and/or submitted via an API or portal exposed by the computing device 102. Thus, operation 202 can include detecting creation of the request, in some embodiments. It should be understood that this example is illustrative and therefore should not be construed as being limiting in any way.

From operation 202, the method 200 can proceed to operation 204. At operation 204, the computing device 102 can determine one or more features of a service or application requested by way of the request received in operation 202. According to various embodiments, the computing device 102 can analyze the request received in operation 202 and determine, based upon the request and/or feature and/or component data included in or with the request, what features are requested by way of the request. According to various embodiments, the computing device 102 can parse the feature and/or component data ("feature data") from the request received in operation 202, analyze the request received in operation 202 to identify the features requested by way of the request, receive the feature data with the request, and/or otherwise determine what features are requested by way of the request. It should be understood that the computing device 102 can identify the requested features in additional and/or alternative manners.

In some embodiments, for example, the computing device 102 can expose a web portal or other portal via which the request can be created and/or submitted. In one contemplated embodiment, a user interface ("UI") can be presented to a user or other entity to create the requested application. The UI can include, for example, a list of features and/or components that are available in the catalog 128. Thus, the UI can present, for example, representations of one or more (or all) of the products, components, services, and/or features that are available as represented by the product data 130, the component data 132, and/or other information included in the catalog 128.

Figure 3:
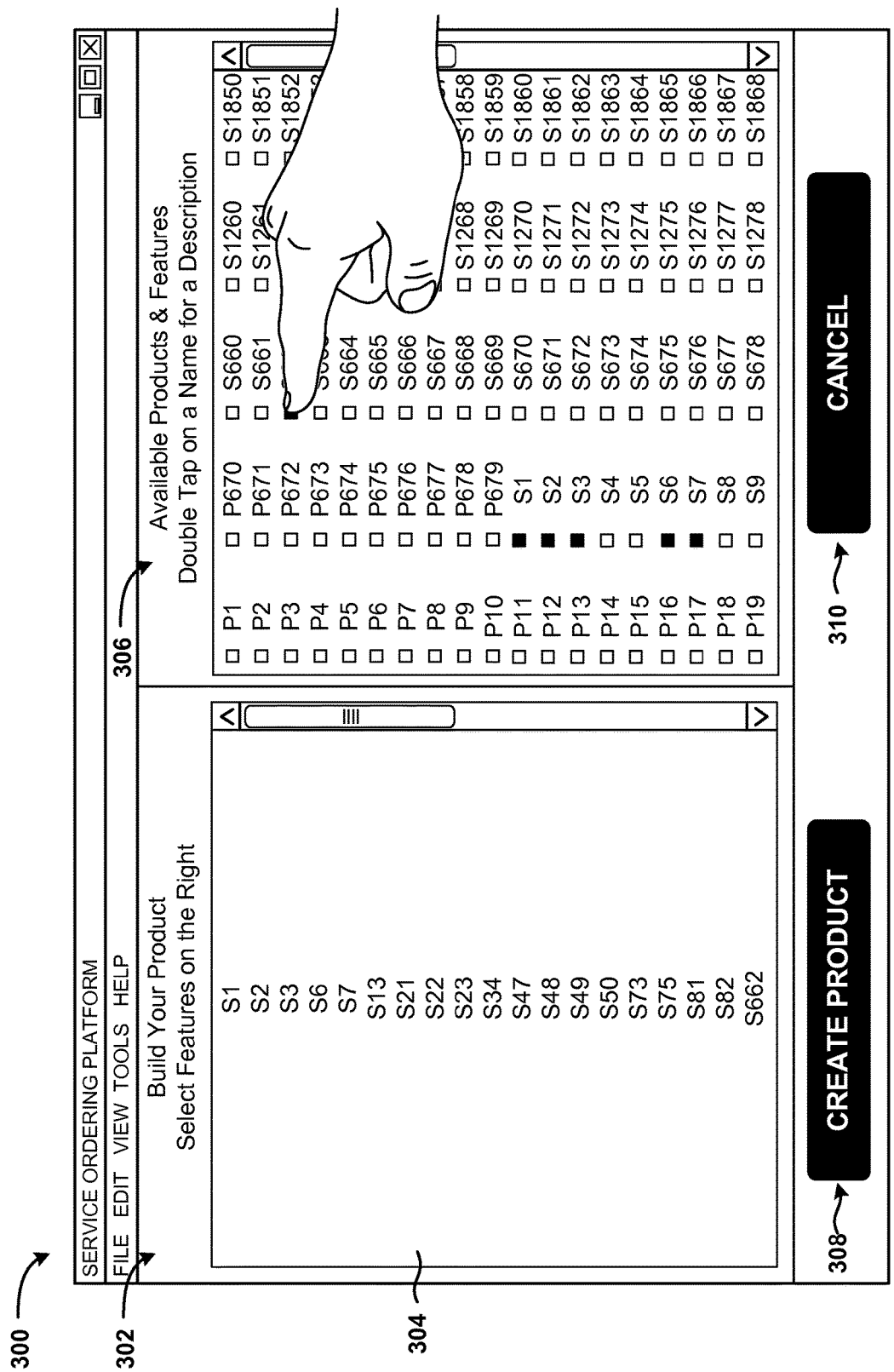
FIG. 3 is a user interface diagram showing an example screen display for interacting with a virtualized services discovery and recommendation engine, according to an illustrative embodiment of the concepts and technologies described herein.

A user or other entity can manipulate the UI to select one or more representations of features or components. According to some embodiments, the representations of features or components can be selected (e.g., by selecting text that represents the features or components, by selecting check boxes that represent the features or components, by dragging and dropping features or components into a workspace that represents the service being requested, or the like). One example UI for requesting the features or components is illustrated in FIG. 3. In some embodiments where the request in operation 202 is created via a portal, an API, or the like, operation 204 can include detecting the request of these features or components. Because the features or components can be determined in additional and/or alternative manners, it should be understood that this example is illustrative and therefore should not be construed as being limiting in any way.

From operation 204, the method 200 can proceed to operation 206. At operation 206, the computing device 102 can obtain requestor data 118. According to various embodiments, the computing device 102 can obtain the requestor data 118 associated with a requestor 112 that created and/or is associated with the request received in operation 202. In various embodiments, the computing device 102 can identify the requestor 112 and obtain, from the data store 120, the requestor data 118 associated with the requestor 112. In various embodiments, the computing device 102 can execute a query against the requestor data 118. The query can specify an identity of the requestor 112, and the data store 120 can respond to the query with the requestor data 118 that is associated with the requestor 112. Because the requestor data 118 associated with the requestor 112 can be obtained in additional and/or alternative manners, it should be understood that this example is illustrative and therefore should not be construed as being limiting in any way.

From operation 206, the method 200 can proceed to operation 208. At operation 208, the computing device 102 can identify services and components that satisfy the request received in operation 202. In operation 208, the computing device 102 can search the catalog 128 (e.g., the product data 130 and the component data 132) to identify services and/or components that include or correspond to the features requested in operation 202 (as determined in operation 204). Thus, the computing device 102 can analyze the catalog 128 to identify the services or components in operation 208 and identify the services or components that include the requested features and/or services. According to some contemplated embodiments, the computing device 102 can access and/or query the catalog 128 to identify the features or services. The computing device 102 can identify the features or services via accessing the catalog 128 and/or can receive identification of the features or services as a response to a query. Because the features or services can be identified in additional and/or alternative ways, it should be understood that these examples are illustrative and therefore should not be construed as being limiting in any way.

From operation 208, the method 200 can proceed to operation 210. At operation 210, the computing device 102 can generate one or more recommendations 134. The recommendations 134 generated in operation 210 can correspond to one or more applications, services, and/or service components that can include the features or services identified in operation 208. Thus, for example, if the request received in operation 202 requests a service with features or components A, B, C, and D; the recommendation 134 generated in operation 210 can correspond to a service that includes features or components A, B, C, and D. It should be understood that this example is illustrative and therefore should not be construed as being limiting in any way.

As explained above, the recommendations 134 also can be analyzed by the computing device 102 to determine pricing information, ordering information, operational information, and/or other information as illustrated and described above with reference to FIG. 1. In some embodiments, the computing device 102 can access various network systems 136 to determine if the application or service that is represented by the recommendation 134 can be provided, what price to charge for providing the application or service that is represented by the recommendation 134, whether or not the application or service that is represented by the recommendation 134 is to be added to the catalog 128 for future use, whether any marketing of the application or service that is represented by the recommendation 134 is to be performed, combinations thereof, or the like. Thus, the computing device 102 can access, in operation 210, the active and available inventory 138 to determine availability and the like; the billing systems 140 to determine pricing, charging, and/or billing information; the marketing systems 142 to determine if the application or service that is represented by the recommendation 134 is to be marketed and/or added to the catalog 128, combinations thereof, or the like.

As such, the recommendation 134 generated in operation 210 can include not only a representation of an application or service, but also operational information that indicates how and when the application or service that is represented by the recommendation 134 would be activated, pricing information, ordering information, and/or other information as illustrated and described herein. Thus, the computing device 102 can generate the recommendation 134 based on various interactions with the catalog 128, the network systems 136, and/or other entities. It should be understood that this example is illustrative and therefore should not be construed as being limiting in any way.

In one contemplated embodiment of operation 210, the computing device 102 can assemble the features (determined in operation 204), determine inventory (e.g., to determine if the requestor 112 and/or an associated data center 114 can support an application or service that includes the assembled features), determine pricing for the application or service, and determine marketing for the service or application. As explained above, determining marketing can include, but is not limited to, one or more of adding the application or service (that is being created) to the catalog 128, marketing the application or service, and/or the like. It should be understood that this example is illustrative and therefore should not be construed as being limiting in any way.

From operation 210, the method 200 can proceed to operation 212. At operation 212, the computing device 102 can test the recommendations 134 generated in operation 210. According to various embodiments, the computing device 102 can test the recommendations 134 using the test module 108, though this is not necessarily the case. As explained above, the application or service that is represented by the recommendation 134 can be run in a simulated execution environment (e.g., a test environment) and operation of the application or service that is represented by the recommendation 134 can be monitored. The computing device 102 can determine, based upon the monitoring, if the application or service that is represented by the recommendation 134 operates as intended, if there are any errors in the application or service that is represented by the recommendation 134, combinations thereof, or the like. The testing also can simulate various network conditions, outages, and the like, to determine if the application or service that is represented by the recommendation 134 will function correctly when deployed to the data center 114.

During the testing, the computing device 102 can address any errors (if detected) and update the recommendation 134 accordingly. Thus, for example, if a particular feature is not compatible with other features, the incompatible features may be removed, or the like. In some embodiments, the computing device 102 can output a report showing errors and/or allowing a requestor 112 or other entity to determine how to address the detected errors (e.g., if features A and B are incompatible, the requestor 112 or other entity can elect whether to remove A or B). Although not separately shown in FIG. 2, the recommendation 134 can be updated as a result of the testing. It should be understood that this example is illustrative and therefore should not be construed as being limiting in any way.

From operation 212, the method 200 can proceed to operation 214. At operation 214, the computing device 102 can provide the recommendations 134 generated in operation 210 and tested in operation 212 to the requestor 112. It can be appreciated that the recommendations 134 provided to the requestor 112 may be updated during the testing of the recommendations 134 as explained above with reference to operation 212. Thus, the recommendations 134 can be provided to the requestor 112 to determine if the application or service that is represented by the recommendation 134 meets the needs or desires of the requestor 112. As explained above, the recommendation 134 provided to the requestor in operation 214 can include pricing information, ordering information, operational information, and other information in addition to describing and/or representing the application or service. It should be understood that this example is illustrative and therefore should not be construed as being limiting in any way.

From operation 214, the method 200 can proceed to operation 216. At operation 216, the computing device 102 can deploy the recommendations 134. The functionality illustrated in operation 216 can correspond to the computing device 102 determining that one or more of the recommendations 134 provided in operation 214 have been approved and/or that one or more applications or services that are represented by the recommendations 134 have been requested by the requestor 112. Thus, it can be appreciated that the operation 216 can include receiving a service order 144 or otherwise receiving an indication that the applications or services that are represented by the recommendation 134 are desired. It should be understood that this example is illustrative and therefore should not be construed as being limiting in any way.

Operation 216 also can include generating one or more commands 146. The commands 146, as explained above with reference to FIG. 1, can cause the data center 114 and/or other entities to deploy, instantiate, and/or activate the applications or services that are represented by the recommendations 134. The commands 146 can cause various entities to activate the applications or services that are represented by the recommendations 134. Operation 216 also can include sending the commands 146 to the data center 114, as explained above. It should be understood that this example is illustrative and therefore should not be construed as being limiting in any way.

From operation 216, the method 200 can proceed to operation 218. The method 200 can end at operation 218.

FIG. 3 is a user interface ("UI") diagram showing aspects of one contemplated UI for using and/or interacting with a discovery and recommendation engine 106, according to some illustrative embodiments. FIG. 3 shows an illustrative screen display 300, which can be displayed on a device (e.g., a device associated with the requestor 112 and/or other entities) via interactions with the discovery and recommendation engine 106. According to some contemplated embodiments, the screen display 300 can be presented in response to interacting with the discovery and recommendation engine 106 via a web portal, ordering platform, API, or the like. According to various embodiments, the computing device 102 can generate the screen display 300 and/or other screen displays in conjunction with and/or based upon interactions with the discovery and recommendation engine 106 described herein (e.g., via rendering web data provided by a web portal exposed by the discovery and recommendation engine 106, or the like) and/or based on interactions with other entities via other access mechanisms. It should be appreciated that the UI diagram illustrated in FIG. 3 is illustrative of one contemplated example of the UIs that can be generated and/or displayed in accordance with the concepts and technologies disclosed herein, and therefore should not be construed as being limited in any way.

According to various embodiments, the screen display 300 can be presented, for example, during interactions between an administrator or other entity (e.g., the requestor 112) and the discovery and recommendation engine 106, for example during creation of a service request 110 as illustrated and described above with reference to FIGS. 1-2. Because the screen display 300 illustrated in FIG. 3 can be displayed at additional and/or alternative times, it should be understood that this example is illustrative and therefore should not be construed as being limiting in any way.

The screen display 300 can include various menus and/or menu options. The screen display 300 also can include service request creation window 302. The service request creation window 302 can be configured to allow a user or other entity to view and/or create products and services that can be included in the catalog 128. The service request creation window 302 can include a service creation window 304 and a catalog display 306, both of which are described in more detail below.

The service creation window 304 can display a window, field, or other UI element for displaying representations of one or more products and/or services that are requested for inclusion in a service or application. The catalog display 306 can include a window, field, or other UI element for displaying representations of one or more products, services, service components, features, or the like that are available for including in the service or application. Thus, it can be appreciated that the representations shown in the catalog display 306 can be populated by analyzing the catalog 128 illustrated and described herein (namely by analyzing the product data 130 and the component data 132), though this is not necessarily the case.

In the illustrated embodiment, a user can tap, click, select, or otherwise interact with the representations of one or more products, services, service components, features, or the like in the catalog display 306 to select one or more of the products, services, service components, features, or the like. By selecting the representations of the products, services, service components, features, or the like, the computing device 102 (or other device that presents the screen display 300) can add the associated products, services, service components, features, or the like to the service request 110. This is illustrated in FIG. 3 by showing population of the service creation window 304. In some embodiments, the representations of the products, services, service components, features, or the like may be dragged and dropped from the catalog display 306 to the service creation window 304, or the like.

The service request creation window 302 also can include a UI control 308 that, when selected, creates a service request 110 that includes feature data corresponding to the products, services, service components, features, or the like represented by the representations of the products, services, service components, features, or the like in the service creation window 304. Thus, selection of the UI control 308 can cause the computing device 102 to create a service request 110 as illustrated and described herein. The service request creation window 302 also can include a UI control 310 that, when selected, cancels creation of the service request 110. Because additional or alternative controls can be included in the service request creation window 302, it should be understood that the example embodiment shown in FIG. 3 is illustrative and therefore should not be construed as being limiting in any way.

Figure 4:
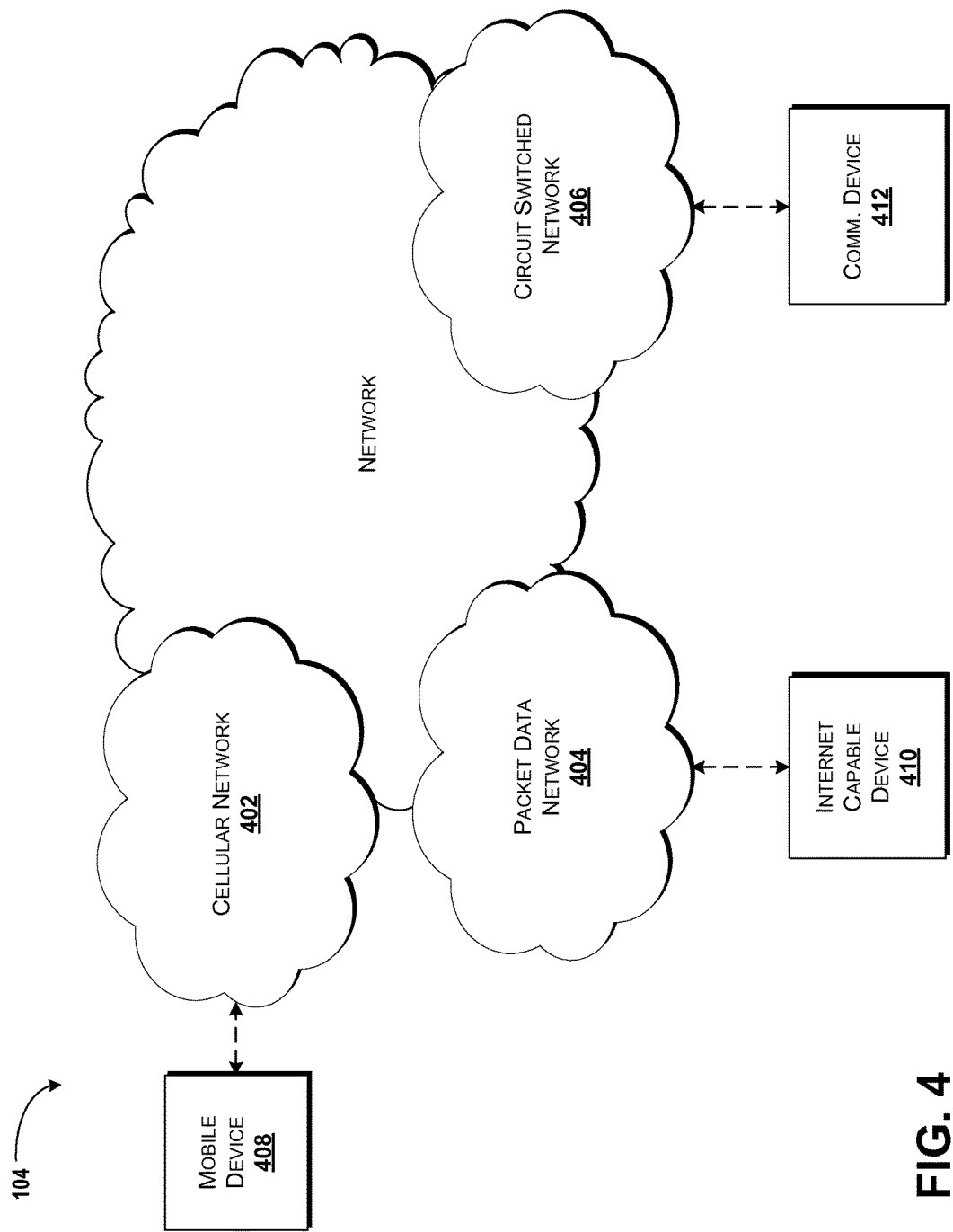
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
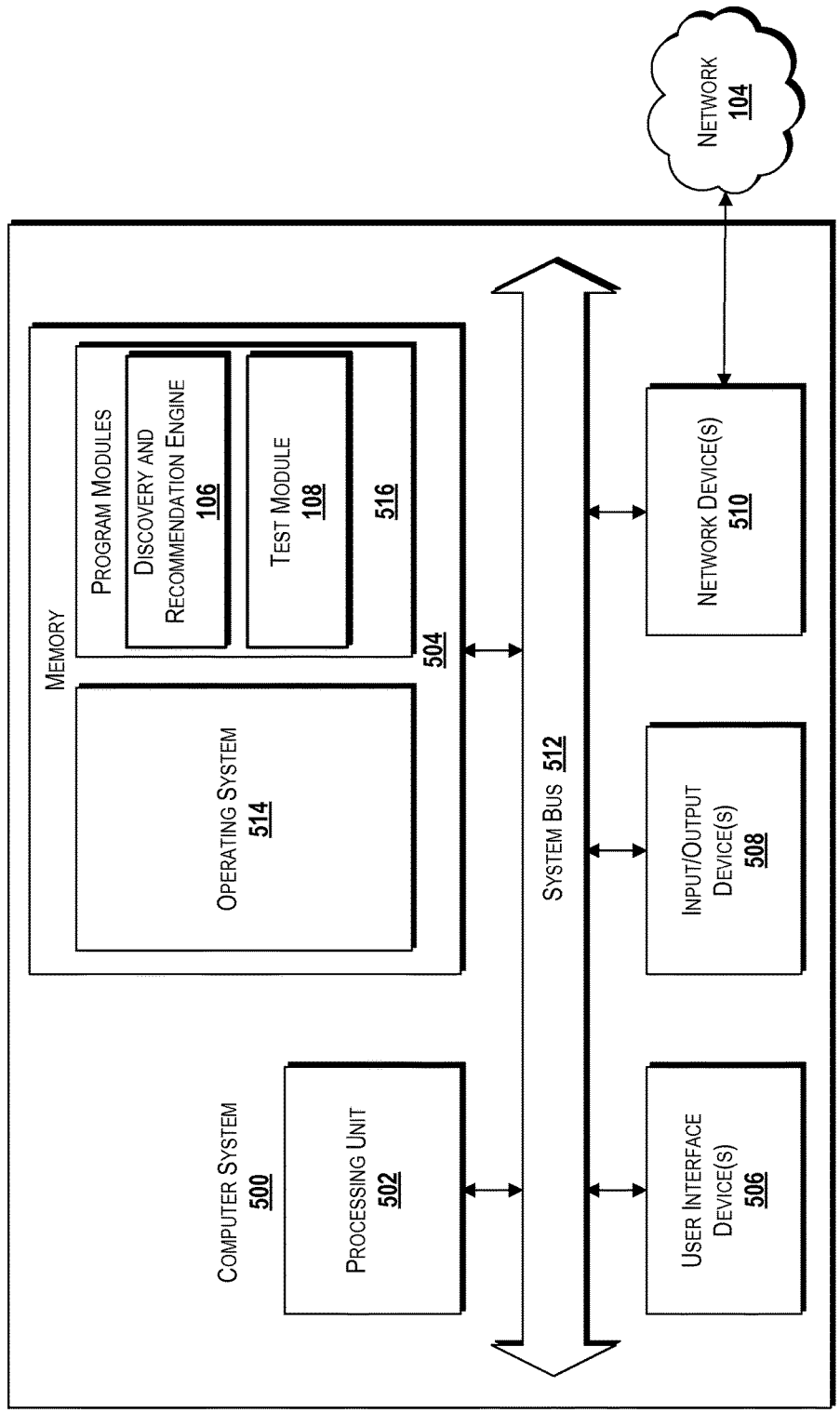
FIG. 5 is a block diagram illustrating an example computer system configured to provide a virtualized services discovery and recommendation engine, according to some illustrative embodiments of the concepts and technologies described herein.

FIG. 5 is a block diagram illustrating a computer system 500 configured to provide the functionality described herein for providing a virtualized services discovery and recommendation engine, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the discovery and recommendation engine 106, the test module 108, and/or other program modules. This and/or other programs can be embodied in computer-readable media containing instructions that, when executed by the processing unit 502, perform one or more of the method 200 described in detail above with respect to FIG. 2. According to embodiments, the program modules 516 may be embodied in hardware, software, firmware, or any combination thereof. Although not shown in FIG. 5, it should be understood that the memory 504 also can be configured to store the service request 110, the requestor data 118, the catalog 128, the recommendation 134, the service order 144, the commands 146, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a virtualized services discovery and recommendation engine have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:
1. A system comprising:
a processor; and
a memory that stores computer-executable instructions that, when executed by the processor, cause the processor to perform operations comprising receiving a request for a service from a requestor, the request comprising feature data that defines a plurality of features to be included in the service requested by the request, obtaining requestor data that indicates a network configuration of a data center associated with the requestor and an inventory of the data center associated with the requestor, identifying, based on the requestor data and the feature data, a plurality of services that satisfy the request and that are available, generating a recommendation comprising a data representation of a custom product that comprises the plurality of services, testing, in a simulated execution environment, the custom product that is represented by the recommendation to determine that the custom product functions, and providing the recommendation to the requestor.

2. The system of claim 1, wherein generating the recommendation comprises assembling the plurality of services that satisfy the request to create the custom product.

3. The system of claim 2, wherein generating the recommendation further comprises:

determining, based on the inventory of the data center associated with the requestor, if the custom product can be accommodated by the data center associated with the requestor; and if a determination is made that the custom product can be accommodated by the data center associated with the requestor, determining a pricing associated with the custom product, and determining if the custom product should be added to a product catalog.

4. The system of claim 3, wherein determining the pricing comprises accessing a billing system, providing the recommendation to the billing system, and receiving the pricing from the billing system.

5. The system of claim 1, wherein the computer-executable instructions, when executed by the processor, cause the processor to perform operations further comprising:

in response to receiving input indicating an approval of the recommendation, deploying the recommendation to the data center associated with the requestor.

6. The system of claim 1, wherein the computer-executable instructions, when executed by the processor, cause the processor to perform operations further comprising:

in response to receiving input indicating an approval of the recommendation, generating a command to instantiate the custom product, and sending the command to the data center associated with the requestor.

7. The system of claim 1, wherein the computer-executable instructions, when executed by the processor, cause the processor to perform operations further comprising:

receiving a service order from the requestor, the service order comprising data that indicates that the custom product should be deployed; and in response to receiving the service order,
generating commands to deploy the custom product, and
sending the commands to the data center associated with the requestor.

8. The system of claim 1, wherein the requestor data further comprises history data that defines a service usage history associated with the requestor.

9. The system of claim 1, wherein the recommendation comprises pricing information associated with the custom product, ordering information associated with the custom product, and operational information associated with the custom product.

10. The system of claim 1, further comprising a web portal via which the request is received, wherein receiving the request comprises:

presenting a user interface via the web portal, wherein the user interface presents a catalog of services, and receiving, via the user interface, via the web portal, and from the requestor, selection of a plurality of the services.

11. A computer storage medium having computer-executable instructions stored thereon that, when executed by a processor, cause the processor to perform operations comprising:

receiving a request for a service from a requestor, the request comprising feature data that defines a plurality of features to be included in the service requested by the request;

obtaining requestor data that indicates a network configuration of a data center associated with the requestor and an inventory of the data center associated with the requestor;

identifying, based on the requestor data and the feature data, a plurality of services that satisfy the request and that are available;

generating comprising a data representation of a custom product that comprises the plurality of services;

testing, in a simulated execution environment, the custom product that is represented by the recommendation to determine that the custom product functions; and providing the recommendation to the requestor.

12. The computer storage medium of claim 11, wherein generating the recommendation comprises assembling the plurality of services that satisfy the request to create the custom product;

determining, based on the inventory of the data center associated with the requestor, if the custom product can be accommodated by the data center associated with the requestor; and if a determination is made that the custom product can be accommodated by the data center associated with the requestor, determining a pricing associated with the custom product, and determining if the custom product should be added to a product catalog.

13. The computer storage medium of claim 11, wherein the computer-executable instructions, when executed by the processor, cause the processor to perform operations further comprising:

receiving a service order from the requestor, the service order comprising data that indicates that the custom product should be deployed; and in response to receiving the service order,
generating commands to deploy the custom product, and
sending the commands to the data center associated with the requestor.

14. The computer storage medium of claim 11, wherein the recommendation comprises pricing information associated with the custom product, ordering information associated with the custom product, and operational information associated with the custom product.

15. The computer storage medium of claim 11, wherein the request is received via a web portal, wherein receiving the request comprises presenting a user interface via the web portal, wherein the user interface presents a catalog of services and receiving, via the user interface, via the web portal, and from the requestor, selection of a plurality of the services.

16. A method comprising:

receiving, at a computing device that executes a discovery and recommendation engine, a request for a service from a requestor, the request comprising feature data that defines a plurality of features to be included in the service requested by the request;

obtaining, by the computing device, requestor data that indicates a network configuration of a data center associated with the requestor and an inventory of the data center associated with the requestor;

identifying, by the computing device and based on the requestor data and the feature data, a plurality of services that satisfy the request and that are available;

generating, by the computing device, a recommendation comprising a data representation of a custom product that comprises the plurality of services;

testing, by the computing device and in a simulated execution environment, the custom product that is represented by the recommendation to determine that the custom product functions; and providing, by the computing device, the recommendation to the requestor.

17. The method of claim 16, wherein generating the recommendation comprises assembling the plurality of services that satisfy the request to create the custom product;

determining, based on the inventory of the data center associated with the requestor, if the custom product can be accommodated by the data center associated with the requestor; and if a determination is made that the custom product can be accommodated by the data center associated with the requestor, determining a pricing associated with the custom product, and determining if the custom product should be added to a product catalog.

18. The method of claim 16, further comprising:

receiving a service order from the requestor, the service order comprising data that indicates that the custom product should be deployed; and in response to receiving the service order,
generating commands to deploy the custom product, and
sending the commands to the data center associated with the requestor.

19. The method of claim 16, wherein the recommendation comprises pricing information associated with the custom product, ordering information associated with the custom product, and operational information associated with the custom product.

20. The method of claim 16, wherein the request is received via a web portal, wherein receiving the request comprises presenting a user interface via the web portal, wherein the user interface presents a catalog of services and receiving, via the user interface, via the web portal, and from the requestor, selection of a plurality of the services.

* * * * *